United States Patent
Yokoyama et al.

[11] Patent Number: 5,137,995
[45] Date of Patent: Aug. 11, 1992

[54] PROCESS FOR PREPARATION OF OLEFIN POLYMERS

[75] Inventors: Masuzo Yokoyama; Kouichi Katou; Toshihiko Sugano, all of Yokkaichi, Japan

[73] Assignee: Mitsubishi Petrochemical Company Limited, Tokyo, Japan

[21] Appl. No.: 711,706

[22] Filed: Jun. 7, 1991

Related U.S. Application Data

[63] Continuation of Ser. No. 373,597, Jun. 30, 1989, abandoned, which is a continuation of Ser. No. 128,774, Nov. 25, 1987, abandoned, which is a continuation of Ser. No. 889,191, Jul. 25, 1986, abandoned.

[30] Foreign Application Priority Data

Jul. 25, 1985 [JP] Japan .................. 60-164554

[51] Int. Cl.$^5$ .................. C08F 4/654; C08F 4/656
[52] U.S. Cl. .................. 526/119; 502/125; 526/125; 526/351
[58] Field of Search .................. 526/119, 128, 125

[56] References Cited

U.S. PATENT DOCUMENTS

| | | | |
|---|---|---|---|
| 4,399,055 | 8/1983 | Matsuura et al. | 526/125 |
| 4,550,094 | 10/1985 | Hanji et al. | 526/114 |
| 4,563,436 | 1/1986 | Yokoyama et al. | 526/125 |
| 4,565,798 | 1/1986 | Yamamoto et al. | 526/124 |
| 4,581,426 | 4/1986 | Asanuma et al. | 526/128 |

FOREIGN PATENT DOCUMENTS 45975 2/1982 European Pat. Off. .......... 526/128

Primary Examiner—Edward J. Smith
Attorney, Agent, or Firm—Oblon, Spivak, McClelland, Maier & Neustadt

[57] ABSTRACT

A process for the preparation of olefin polymers, which comprises polymerizing an olefin in the presence of a catalyst which comprises: (A) a solid catalyst component obtained by contacting a magnesium dihalide such as $MgCl_2$ with a titanium tetra-alkoxide such as $Ti(O-nBu)_4$ and then with a polymeric silicon compound having a structure represented by the formula $$-\underset{\underset{H}{|}}{\overset{\overset{R}{|}}{Si}}-O-$$

wherein R stands for a hydrocarbon residue such as $CH_3$,
and contacting the obtained solid component with a halogen compound of silicon such as $SiCl_4$ or with a halogen compound of silicon such as $SiCl_4$ and a halogen compound of titanium such as $TiCl_4$, (B) an organo-aluminum compound such as $Al(Et)_3$; and (C) an organic silicon compound having an Si—O—C linkage such as $PhSi(OEt)_3$. According to this process, a polymer having a high stereoregularity, a narrow particle size distribution and a high bulk density can be obtained in a high yield with a high efficiency.

5 Claims, No Drawings

PROCESS FOR PREPARATION OF OLEFIN POLYMERS

This application is a continuation of application Ser. No. 07/373,597 filed on Jun. 30, 1989 now abandoned which is a continuation of abandoned application Ser. No. 07/125,774 filed on Nov. 25, 1987 which is a continuation of abandoned Ser. No. 06/889,191 filed Jul. 25, 1986.

BACKGROUND OF THE INVENTION

1. Field of the Art

The present invention relates to a process for the preparation of olefin polymers. More particularly, the present invention relates to a process for the polymerization of α-olefins having at least 3 carbon atoms, in which a polymer having a high stereoregularity is prepared in a high yield by using a catalyst which does not contain an electron donor such as an organic acid ester, an amide or an ether as an internal donor or external donor.

2. Description of the Prior Art

It is said that a catalyst system comprising a solid catalyst component having a titanium compound supported on a magnesium halide and an organoaluminum compound has a higher polymerization activity than conventional catalyst systems, and removal of the catalyst residue from the polymer formed is not necessary. However, the stereoregularity of the polymer formed by using this supported type catalyst is low, and it has been considered that omission of the step of extracting an atactic polymer is not permissible. Recently, various catalyst systems in which the stereoregularity is considerably improved by using a solid catalyst component comprising a magnesium halide, a titanium compound and an electron donor, especially a specific carboxylic acid ester, have been proposed (see Japanese Patent Publications No. 52-36786, No. 52-36913 and No. 52-50037).

According to these proposals, in order to obtain a polymer having an industrially appreciable high stereoregularity, it is ordinarily necessary to use an electron donor component, especially a specific carboxylic acid ester, in addition to a solid catalyst component and an organoaluminum compound. As a result, the obtained polymer has involved a serious problem of generation of a smell owing to the catalyst residue derived from the solid catalyst component and the electron donor component used at the polymerization. It is very difficult to eliminate the smell-generating cause in the polymer by a post treatment, and such a post treatment is disadvantageous from the industrial viewpoint.

Generally, in the step of preparing a solid catalyst component having a high activity and providing a polymer having a high stereoregularity and good properties, which contains an electron donor such as an ester, it is necessary to perform a heat treatment by using a large amount of TiCl$_4$. Accordingly, recovery and disposal of TiCl$_4$ after the use are necessary, and the catalyst-preparing apparatus and operation become complicated. Therefore, improvement of the technique of preparing the solid catalyst component has been desired.

Furthermore, a method in which a magnesium halide is contacted with TiCl$_4$ and an electron donor component by pulverization, followed by washing with a solvent such as a halogenated hydrocarbon compound, if necessary has been proposed. In this method the heating step using a large amount of TiCl$_4$ is not indispensable. However, the properties of the polymer obtained are inadequate, and further improvement is desired. The polymer properties are very important in slurry polymerization and gaseous phase polymerization. For example, if the polymer properties are poor, such troubles as adhesion of the polymer in a polymerization vessel and insufficient withdrawal of the polymer from the polymerization vessel arise. Furthermore, the polymer concentration in the polymerization vessel has a close relation to the polymer properties, and if the polymer properties are poor, it is impossible to increase the polymer concentration in the polymerization vessel. The fact that it is impossible to increase the polymer concentration is very disadvantageous from the industrial viewpoint.

A process for preparing a solid catalyst component for the polymerization of olefins, which does not comprise an electron donor such as a carboxylic acid ester, is proposed in, for example, Japanese Patent Application Laid-Open Specifications No. 54-78786, No. 58-5309, No. 58-5310, and No 58-5311. According to these proposals, polymerization of an α-olefin having at least 3 carbon atoms is carried out in the presence of a catalyst system utilizing a carboxylic acid ester as an external donor. Accordingly, the stereoregularity and yield of the formed polymer are very low.

A process in which a solid catalyst component, an organoaluminum compound component and an organic silicon compound component having an Si—O—C linkage are used for polymerizing an α-olefin having at least 3 carbon atoms is proposed in Japanese Patent Application Laid-Open Specifications No. 54-94590 and No. 55-36203, Japanese Patent Publication No. 58-21921 and Japanese Patent Application Laid-Open Specification No. 57-63310. However, in these proposals, a heat treatment using a large amount of TiCl$_4$ is necessary or the properties of the obtained polymer are inadequate, and further improvement is desired.

A process in which an α-olefin having at least 3 carbon atoms is polymerized by using a solid catalyst component free of an electron donor such as a carboxylic acid ester, an organic aluminum compound component and an organic silicon compound having an Si—O—C linkage is disclosed in Japanese Patent Application Laid-Open Specifications No. 56-41206 and 57-63312. However, these processes are inadequate for obtaining satisfactory stereoregularity, activity and polymer properties, and the above mentioned technical problems cannot be solved according to these processes.

SUMMARY OF THE INVENTION

In accordance with the present invention, there is provided a process for the preparation of olefin polymers, which comprises contacting an olefin with a catalyst, wherein the catalyst comprises (A) a solid catalyst component obtained by contacting a magnesium dihalide with a titanium tetra-alkoxide and then with a polymeric silicon compound having a structure represented by the formula:

wherein R stands for a hydrocarbon residue of 1 to 10 carbon atoms,
and contacting the solid component thus obtained with a halogen compound of silicon or with a halogen compound of silicon and a halogen compound of a titanium, (B) an organic aluminum compound and (C) an organic silicon compound having an Si—O—C linkage.

According to the process of the present invention, polymerization activity is increased and improved, in durability, and a polymer having a high stereoregularity, a narrow particle size distribution with a reduced amount of fine powder, a high bulk density, and excellent polymer properties can be prepared. Since an electron donor such as a carboxylic acid ester is not used as the catalyst component, the problem of smell of the product polymer is substantially solved.

Furthermore, since a heat treatment using a large amount of TiCl$_4$ is not necessary, the industrial productivity of the solid catalyst component is highly improved.

DETAILED DESCRIPTION OF THE PREFERRED EMBODIMENTS (Catalyst)

The component (A) of the catalyst used in the present invention is a solid catalyst component obtained by contacting a magnesium dihalide with a titanium tetraalkoxide and then with a polymeric silicon compound having a structure represented by the formula:

wherein R stands for a hydrocarbon residue of 1 to 10 carbon atoms, and contacting the obtained solid component with a halogen compound of silicon or with a halogen compound of silicon and a halogen compound of titanium.

As the magnesium dihalide, for example, MgF$_2$, MgCl$_2$ and MgBr$_2$ may be used.

As the titanium tetra-alkoxide, there may be used those whose "alkyl" is usually one containing 1 to ca. 12 carbon atoms, preferably to 1 to ca. 6 carbon atoms, more preferably 2 to 4 carbon atoms. Examples of such tetraalkoxides include Ti(O—C$_2$H$_5$)$_4$, Ti(O—isoC$_3$H$_7$)$_4$, Ti(O—nC$_4$H$_9$)$_4$, Ti(O—nC$_3$H$_7$)$_4$, Ti(O—isoC$_4$H$_9$)$_4$, Ti(O—CH$_2$CH(CH$_3$)$_2$)$_4$, Ti(O—C(CH$_3$)$_3$)$_4$, Ti(O—C$_5$H$_{11}$)$_4$, Ti(O—C$_6$H$_{13}$)$_4$, Ti(O—nC$_7$H$_{15}$)$_4$, Ti(OCH(C$_3$H$_7$)$_2$)$_4$, Ti[OCH(CH$_3$)C$_4$H$_9$]$_4$, Ti(OC$_8$H$_{17}$)$_4$, Ti(OC$_{10}$H$_{21}$)$_4$ and Ti[OCH$_2$CH(C$_2$H$_5$)C$_4$H$_9$]$_4$.

The polymeric silicon compound has as a "monomer" structure represented by the formula:

wherein R stands for a hydrocarbon residue having 1 to about 10 carbon atoms, preferably 1 to about 6 carbon atoms.

As specific examples of the polymeric silicon compound having such structural units, methylhydropolysiloxane, ethylhydropolysiloxane, phenylhydropolysiloxane and cyclohexylhydropolysiloxane can be mentioned.

The polymerization degree of the polymeric silicon compound is not particularly critical, but in view of its handling facility, it is preferable that the polymerization degree be such that the viscosity will be about 10 cSt. The terminal structure of the hydropolysiloxane is not particularly significant, but it is preferable that the terminals be blocked by an inert group such as a trialkylsilyl group.

The amounts used of the magnesium dihalide, titanium tetra-alkoxide and polymeric silicon compound are optional, as long as the intended effects of the present invention can be attained. Generally, however, these amounts are preferably within ranges described below.

The amount used of the titanium tetra-alkoxide is such that the molar ratio of the titanium tetra-alkoxide to the magnesium dihalide is from 0.1 to 10, preferably from 1 to 4.

The amount used of the polymeric silicon compound is such that the molar ratio of the polymeric silicon compound to the magnesium dihalide is from $1 \times 10^{-2}$ to 100, preferably from 0.1 to 10.

The contacting of the above mentioned three components can be performed by a known optional method. The contacting is carried out at a temperature of $-100°$ to 200° C., preferably 0° to 70° C. The contact time is about 10 minutes to about 20 hours, preferably from 0.5 to 5 hours.

It is preferable that this contact be conducted with stirring, but the contact can also be accomplished by mechanical pulverization using a ball mill or a vibrating mill. The sequence of the contacting of the three components is such that the magnesium dihalide is first contacted with the titanium tetra-alkoxide and then with the polymeric silicon compound.

The contacting of the three components can also be carried out in the presence of a dispersion medium. As the dispersion medium, hydrocarbons, halogenated hydrocarbons and dialkylpolysiloxanes can be mentioned. As specific examples of the hydrocarbon, hexane, heptane, toluene and cyclohexane can be mentioned. As specific examples of the halogenated hydrocarbon, n-butyl chloride, 1,2-dichloroethylene, carbon tetrachloride and chlorobenzene can be mentioned. As specific examples of the dialkylpolysiloxane, dimethylpolysiloxane and methylphenylpolysiloxane can be mentioned.

In the above mentioned manner, the magnesium dihalide is contacted with the titanium tetra-alkoxide and then with the polymeric silicon compound to obtain a solid component.

In many cases, the specific surface area of this solid component is small being ordinarily smaller than 10 m$^2$/g, and the majority has a specific surface area smaller than 3 m$^2$/g. According to the analysis by X-ray diffraction spectroscopy, it is found that there is present no diffraction peak of a crystalline substance. Accordingly, the solid component cannot be identified as the magnesium dihalide.

A compound represented by the following general formula:

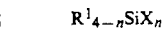

wherein: R$^1$ stands for a hydrocarbon residue of 1 to 10 carbon atoms, preferably a lower alkyl or phenyl; X stands for a halogen atom; and n is a number in the range of $1 \leq n \leq 4$,
can be used as the halogen compound of silicon. Specific examples are $SiCl_4$, $SiBr_4$, $CH_3SiCl_3$, $C_2H_5SiCl_3$, $C_3H_7SiCl_3$, $C_4H_9SiCl_3$, $C_6H_{13}SiCl_3$, $C_6H_{11}SiCl_3$, $C_6H_5SiCl_3$, $CH_3C_6H_4SiCl_3$, $C_2H_3SiCl_3$, $(C_2H_5)_2SiCl_2$, $(C_6H_5)_2SiCl_2$ and $(CH_3)_3SiCl$. These halogen compounds of silicon can also be used in the form of mixtures of two or more thereof.

Halogen compounds of trivalent titanium and tetravalent titanium, especially halogen compounds of tetravalent titanium, are preferably used as the halogen compound of titanium. Chlorine is preferred as the halogen. Halogen compounds of titanium represented by the following general formula:

$$Ti(OR^2)_nCl_{4-n}$$

wherein $R^2$ stands for a hydrocarbon residue having 1 to 10 carbon atoms, preferably a lower alkyl, and n is 0, 1 or 2,
are especially preferred. Specific examples are titanium tetrachloride and trichlorobutoxytitanium.

The amounts of the respective components used for contacting the so-obtained solid component with the halogen compound of silicon or with the halogen compound of silicon and the halogen compound of titanium are optional, provided that the intended effects of the present invention can be attained. In general, however, it is preferable that the amounts used of the respective components be within the ranges described below.

In the case where the above mentioned solid component is contacted with the halogen compound of silicon, the halogen compound of silicon is used in an amount of $1 \times 10^{-2}$ to 100 moles, preferably 0.1 to 10 moles, per mole of the magnesium dihalide constituting the solid component.

In the case where the solid component is contacted with the halogen compound of silicon and the halogen compound of titanium, the halogen compound of silicon is used in an amount of $1 \times 10^{-2}$ to 100 moles, preferably 0.1 to 10 moles, per mole of the magnesium dihalide constituting the solid component, and the halogen compound of titanium is used in an amount of $1 \times 10^{-2}$ to 100 moles, preferably 0.1 to 10 moles, per mole of the magnesium dihalide constituting the solid component.

In the process of the present invention, the polymerization activity is highly improved by using the halogen compound of silicon or the halogen compound of silicon and the halogen compound of titanium.

The contacting of the solid component with the halogen compound of silicon or the halogen compound of silicon and the halogen compound of titanium can be carried out according to a known optional method. This contacting is carried out at a temperature of $-100°$ to $200°$ C., preferably $0°$ to $100°$ C. The contact time is about 10 minutes to about 20 hours, preferably 0.5 to 5 hours.

It is preferable that the contacting be conducted with stirring. The contacting can also be carried out in the presence of a dispersion medium. An appropriate dispersion medium is selected from those mentioned above with respect to the preparation of the solid component.

According to the above described procedures, the solid catalyst component (A), as one component of the catalyst used in the present invention, can be prepared.

The component (B) is an organic aluminum compound.

Compounds represented by the following general formula:

$$AlR^3_nX_{3-n},$$

wherein: $R^3$ stands for a hydrocarbon residue having 1 to 12 carbon atoms; X stands for a halogen atom or an alkoxy group; and n is a number defined by $0 < n \leq 3$,
are used as the organic aluminum compound in the present invention.

Specific examples of the organic aluminum compound are triethylaluminum, tri-n-propylaluminum, tri-n-butylaluminum, tri-isobutylaluminum, tri-n-hexylaluminum, tri-isohexylaluminum, trioctylaluminum, diethylaluminum hydride, di-isobutylaluminum hydride, diethylaluminum monochloride and ethylaluminum sesquichloride. Of course, these organic aluminum compounds can also be used in the form of mixtures of two or more of them.

The ratio between the solid catalyst component (A) and the organic aluminum compound (B) in the catalyst used for the polymerization of an α-olefin can be changed in a broad range. However, it is generally preferable that the organic aluminum compound be used in an amount of 1 to 1,000 moles, especially 10 to 500 moles, per atom of titanium contained in the solid catalyst component.

The component (C) is an organic silicon compound having an Si—O—C linkage. The remaining valences of the Si atom are satisfied preferably with a hydrocarbyl of 1 to ca. 12 carbon atoms or by a group

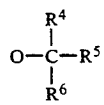

where $R^4 \sim R^6$ are each hydrogen or a lower alkyl. The remaining valences of the C atom in Si—O—C are each satisfied preferably with the $R^4 \sim R^6$ as defined above.

In the present invention, a compound having at least one Si—O—C linkage, for example, an alkoxysilane or aryloxysilane, is used as the organic silicon compound having an Si—O—C linkage. Furthermore, an alkoxy group-containing siloxane and a silyl ester of a carboxylic acid may be used.

Specific examples are trimethylmethoxysilane, trimethylethoxysilane, dimethyldimethoxysilane, dimethyldiethoxysilane, tert-butylmethyldimethoxysilane, tert-butylmethyldiethoxysilane, 2-norbornanemethyldimethoxysilane, 2-norbornanemethyldiethoxysilane, diphenyldimethoxysilane, methylphenyldimethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, n-butyltriethoxysilane, tert-butyltriethoxysilane, phenyltriethoxysilane, chlorotriethoxysilane, 2-norbornanetriethoxysilane, 2-ethylidene-2-norbornanetrimethoxysilane and tetraethoxysilane.

Among these compounds, organic silicon compounds having 2 to 3 alkoxy groups, such as phenyltrimethoxysilane, phenyltriethoxysilane, 2-norbornanetriethoxysilane, 5-ethylidene-2-norbornanetriethoxysilane, 5-ethylidene-2-norbornanetrimethoxysilane, tert-butyltrimethoxysilane, tert-butyltrimethoxysilane, methylphenyldimethoxysilane, methylphenyldiethoxysilane, 2-norbornanemethyldimethoxysilane, 2-norbornanemethyldiethoxysilane, tertbutylmethyldimethoxysilane and tert-butylmethyldiethoxysilane are preferred.

The organic silicon compound (C) having an Si—O—C linkage is used in an amount of 0.001 to 1 mole, preferably 0.01 to 0.5 mole, per mole of the organic aluminum compound.

The sequence and frequency of the contacting and mixing of the above mentioned solid catalyst component (A), organic aluminum compound (B) and organic silicon compound (C) are optional, and a known method may be used for the contacting and mixing.
(Polymerization)

As the olefin used in the process of the present invention, α-olefins such as ethylene, propylene, 1-butene, 1-hexene and 4-methylpentene can be mentioned. Not only homopolymerization of these olefins but also random or block copolymerization of two or more of these olefins can be carried out. In the case of the copolymerization, a polyunsaturated compound such as a conjugated diene or a non-conjugated diene can also be used as a comonomer olefin.

Possible polymerization methods are a so-called slurry polymerization method using an inert hydrocarbon solvent such as hexane or heptane, a solution polymerization method using a liquid monomer as the solvent and a gas phase polymerization method in which the monomer is present in the gaseous state.

The polymerization temperature is about 20° to about 150° C., preferably about 40° to about 100° C., and the polymerization pressure is atmospheric pressure to about 100 atmospheres, preferably atmospheric pressure to about 50 atmospheres. The molecular weight of the polymer is adjusted mainly by using hydrogen.

The present invention will now be described in detail by way of the following examples that by no means are intended to limit the scope of the invention.

EXAMPLE 1 AND COMPARATIVE EXAMPLE 1

[Synthesis of Solid Catalyst Component (A)]

A flask having a capacity of 300 ml, the inside atmosphere of which was thoroughly replaced by nitrogen, was charged with 50 ml of dehydrated and oxygen-removed n-heptane. Then 0.1 mole of $MgCl_2$ (magnesium chloride) and 0.2 mole of $Ti(OBu)_4$ (tetrabutoxytitanium) were introduced into the flask, and reaction was carried out at 90° C. for 2 hours to form a hydrocarbon solution of $MgCl_2$. Then, the temperature was lowered to 40° C., and 12 ml of methylhydropolysiloxane (having a viscosity of 20 cSt) was introduced into the flask. Reaction was thus carried out for 3 hours, whereupon about 40 g of a greyish white solid was precipitated. The precipitated solid was washed well with n-heptane and analyzed, and it was found that 12.1% by weight of $MgCl_2$ was contained in the precipitated solid (estimated from the analyzed value of Mg, which was 3.09% by weight).

In Comparative Example 1, this precipitated solid was used.

A flask having a capacity of 300 ml, the inner atmosphere of which was thoroughly replaced by nitrogen, was charged with 65 ml of a heptane slurry containing 20 g of the solid component synthesized as described above. Then, 5.8 ml of $SiCl_4$ (silicon tetrachloride) and 25 ml of n-heptane were added at 30° C. over a period of 30 minutes, and reaction was carried out at 50° C. for 1 hour. After completion of the reaction, the solid was washed at 50° C. by decantation (with 200 ml of n-heptane 5 times) to obtain a slurry of the intended solid catalyst component (A). A part of the slurry was sampled, and n-heptane was removed by evaporation to dryness. Analysis was then carried out. It was found that 2.01% by weight of titanium was contained in the solid.

[Polymerization of Propylene]

A stainless steel autoclave provided with a stirrer and a temperature-controlling device and having an inner capacity of 1 liter was subjected to evacuation-propylene substitution several times and was charged with 500 ml of dehydrated and oxygen-removed n-heptane, 26.4 mg of phenyltriethoxysilane, 250 mg of triethylaluminum (Si/Al molar ratio=0.05) and 0.5 mg, as the titanium atom, of the slurry of the solid catalyst component (A) (Example 1) or the precipitated solid not treated with $SiCl_4$ (Comparative Example 1) in a propylene atmosphere in the recited order. Then, 80 ml of hydrogen was introduced and polymerization was initiated.

The polymerization was carried out under a propylene pressure of 7 $Kg/cm^2G$ at 70° C. for 3 hours. After completion of the polymerization, the residual monomer was purged; the polymer slurry was filtered; and the amount of the formed polymer was determined by drying of the powdery polymer and concentration of the filtrate. The stereoregularity of the powdery polymer (hereinafter referred to as "product II") was determined by the boiling n-heptane extraction test. Furthermore, total II (ratio of the amount of the boiling n-heptane-insoluble polymer to the total amount of the formed polymer) was calculated according to the following formula:

Total II=(amount of powdery polymer) x product II/[(amount of powdery polymer)+(amount of polymer formed by concentration of filtrate)]

The obtained results are shown in Table 1.

TABLE 1

| | Results of Polymerization of Propylene | | | | | |
|---|---|---|---|---|---|---|
| | Activity (g of polymer/ g of solid catalyst) | Atactic Formation Ratio* (%) | Product II (%) | Total II (%) | M.I. (g/10 min.) | Bulk Density of Polymer (g/cc) |
| Example 1 | 2,200 | 1.11 | 95.5 | 94.4 | 67.0 | 0.40 |
| Comparative Example 1 | 0 | — | — | — | — | — |

*atactic formation ratio = [(polymer formed by concentration of filtrate)/(total formed polymer)] × 100

EXAMPLES 2 THROUGH 7

A solid catalyst component (A) was prepared in the manner described in Example 1 except that the amount of the n-heptane slurry containing 20 g of the solid component was adjusted as shown in Table 2. $SiCl_4$ in an amount shown in Table 4 was introduced at 15° C., and reaction was carried out at 15° C. for 2 hours and then at 50° C. for 4 hours. By using the so-obtained solid catalyst component (A), polymerization of propylene was carried out in the manner described in Example 1 except that the amount used of phenyltriethoxysilane was changed to 105 mg. The obtained results are shown in Table 2.

TABLE 2

| | Preparation of Solid Catalyst Component (A) | | | Results of Polymerization of Propylene | | | | | |
|---|---|---|---|---|---|---|---|---|---|
| Exam. No. | Amount of slurry containing solid component (ml) | SiCl₄ (ml) | Ti Content (% by weight) | Activity (g of polymer/g of solid catalyst) | Atactic Formation Ratio (%) | Product II (%) | Total II (%) | M.I. (g/10 min.) | Bulk Density of Polymer (g/cc) |
| 2 | 40 | 5.8 | 3.55 | 4,500 | 0.91 | 98.1 | 97.2 | 8.3 | 0.38 |
| 3 | " | 8.7 | 4.40 | 8,600 | 0.89 | 97.0 | 96.1 | 5.2 | 0.39 |
| 4 | " | 11.6 | 5.21 | 6,400 | 1.62 | 97.6 | 96.0 | 8.6 | 0.36 |
| 5 | 50 | 5.8 | 2.64 | 4,000 | 0.47 | 97.6 | 97.1 | 11.3 | 0.45 |
| 6 | " | 8.7 | 3.94 | 5,200 | 1.41 | 98.0 | 96.6 | 4.7 | 0.42 |
| 7 | 65 | 11.6 | 4.67 | 5,500 | 0.91 | 97.0 | 96.1 | 3.9 | 0.43 |

EXAMPLES 8 THROUGH 11

A solid catalyst component (A) was prepared as in Example 1 except that the amount of the n-heptane slurry containing 20 g of the solid component was adjusted to 50 ml, that 11.6 ml of SiCl₄ was added at a temperature shown in Table 3 over a period shown in Table 3, and that reaction was carried out at a temperature shown in Table 3 for a time shown in Table 3. Polymerization of propylene was carried out as in Example 1 except that the so-obtained solid catalyst component (A) was used. The obtained results are shown in Table 3.

EXAMPLE 12

A solid catalyst component (A) was prepared as in Example 6 except that reaction with SiCl₄ was carried out at 10° C. for 4 hours and then at 50° C. for 4 hours. Polymerization of propylene was carried out as in Example 6 except that the obtained solid catalyst component (A) was used. The obtained results are shown in Table 3.

EXAMPLES 13 THROUGH 17

A solid catalyst component (A) was prepared as described in Example 1 except that 11.6 ml of SiCl₄ and a silicon halide compound shown in Table 4 were added at 30° C. over a period of 0.5 hour, and reaction was carried out at 30° C. for 0.5 hour and then at 50° C. for 2 hours. By using the so-obtained solid catalyst component (A), polymerization of propylene was carried out as described in Example 1 except that the amount used of phenyltriethoxysilane was changed to 79.4 mg. The obtained results are shown in Table 4.

TABLE 4

| | Preparation of Solid Catalyst Component (A) | | | Results of Polymerization of Propylene | | | | | |
|---|---|---|---|---|---|---|---|---|---|
| Exam. No. | Silicon Halide Compound | Amount Used (ml) | Ti Content (% by wt.) | Activity (g of polymer/g of solid catalyst) | Atactic Formation Ratio (%) | Product II (%) | Total II (%) | M.I. (g/10 min.) | Bulk Density of Polymer (g/cc) |
| 13 | $C_2H_5SiCl_3$ | 6.6 | 2.78 | 4,300 | 0.64 | 98.0 | 97.4 | 5.2 | 0.42 |
| 14 | $C_3H_7SiCl_3$ | 7.5 | 3.40 | 4,700 | 0.88 | 97.7 | 96.8 | 11.7 | 0.42 |
| 15 | $C_6H_5SiCl_3$ | 8.0 | 3.43 | 5,500 | 1.50 | 98.5 | 97.0 | 5.3 | 0.41 |
| 16 | $(C_6H_5)_2SiCl_2$ | 10.6 | 3.11 | 2,700 | 1.64 | 97.9 | 96.3 | 3.4 | — |
| 17 | not used | — | 3.12 | 4,800 | 1.30 | 96.1 | 94.9 | 7.0 | 0.43 |

EXAMPLES 18 THROUGH 21

Polymerization of propylene was carried out as described in Example 3 except that phenyltriethoxysilane was changed to an organic silicon compound shown in Table 5. The obtained results are shown in Table 5.

COMPARATIVE EXAMPLES 2 AND 3

Polymerization of propylene was carried out as described in Example 3 except that phenyltriethoxysilane was changed to ethyl benzoate in an amount shown in Table 5. The obtained results are shown in Table 5.

TABLE 3

| | Preparation of Solid Catalyst Component (A) | | | Results of Polymerization of Propylene | | | | | |
|---|---|---|---|---|---|---|---|---|---|
| Exam. No. | Addition of SiCl₄ (°C. - hour) | Reaction Conditions °C./hr and then °C./hr | Ti Content (% by wt.) | Activity (g of polymer/g of solid catalyst) | Atactic Formation Ratio (%) | Product II (%) | Total II (%) | M.I. (g/10 min.) | Bulk Density of Polymer (g/cc) |
| 8 | 40-collective | 40/0.5 and then 50/4 | 3.69 | 4,900 | 1.5 | 95.1 | 93.7 | 4.8 | 0.41 |
| 9 | 30-0.5 | 30/0.5 and then 50/4 | 4.10 | 6,700 | 1.6 | 93.0 | 94.5 | 6.0 | 0.44 |
| 10 | 20-collective | 20/0.5 and then 50/4 | 4.26 | 6,600 | 1.2 | 92.9 | 91.8 | 4.8 | 0.45 |
| 11 | 30-0.5 | 30/0.5 and then 70/6 | 4.18 | 8,000 | 2.0 | 94.3 | 92.4 | 6.6 | 0.43 |
| 12 | 10-collective | 10/4 and then 50/4 | 4.16 | 6,900 | 0.68 | 97.3 | 96.6 | 4.8 | 0.44 |

TABLE 5

| | Electron Donor (E.D.) Used for Polymerization | | Results of Polymerization of Propylene | | | | | |
|---|---|---|---|---|---|---|---|---|
| | Electron Donor Compound | E.D./TEA (molar ratio) | Activity (g of polymer/g of solid catalyst) | Atactic Formation Ratio (%) | Product II (%) | Total II (%) | M.I. (g/10 min.) | Bulk Density of Polymer (g/cc) |
| Exam. 18 | diphenyldimethoxysilane | 0.2 | 8,200 | 4.07 | 94.0 | 90.2 | 12.9 | 0.34 |
| Exam. 19 | phenyltrimethoxysilane | 0.2 | 3,500 | 3.20 | 98.6 | 95.4 | 0.44 | 0.31 |
| Exam. 20 | tert-butylmethyl | 0.2 | 11,500 | 0.78 | 97.6 | 96.8 | 3.7 | 0.40 |

TABLE 5-continued

| | Electron Donor (E.D.) Used for Polymerization | | Results of Polymerization of Propylene | | | | | |
|---|---|---|---|---|---|---|---|---|
| | Electron Donor Compound | E.D./TEA (molar ratio) | Activity (g of polymer/g of solid catalyst) | Atactic Formation Ratio (%) | Product II (%) | Total II (%) | M.I. (g/10 min.) | Bulk Density of Polymer (g/cc) |
| Exam. 21 | dimethyoxysilane tetraethoxysilane | 0.2 | 5,100 | 2.42 | 94.5 | 92.2 | 9.3 | 0.35 |
| Comp. Exam. 2 | ethyl benzoate | 0.22 | 5,300 | 7.53 | 91.5 | 84.6 | 2.5 | 0.34 |
| Comp. Exam. 3 | " | 0.33 | 620 | 10.1 | 93.0 | 83.6 | — | — |

EXAMPLE 22

[Preparation of Solid Catalyst Component (A)]

A flask having a capacity of 300 ml, the inner atmosphere of which was thoroughly replaced by nitrogen, was charged with 65 ml of the heptane slurry containing 20 g of a solid component containing 12.1% by weight of $MgCl_2$ which was prepared as described in Example 1. Then, 5.8 ml of $SiCl_4$ (silicon tetrachloride), 5.4 ml of $TiCl_4$ (titanium tetrachloride) and 25 ml of n-heptane were added at 30° C. over a period of 30 minutes, and reaction was carried out at 90° C. for 2 hours. After completion of the reaction, the solid was washed at 50° C. by decantation (with 200 ml of n-heptane 5 times) to obtain a slurry of an intended solid catalyst component (A). A part of the slurry was sampled, and n-heptane was removed by evaporation to dryness. Then analysis was carried out, whereupon it was found that 5.01% by weight of titanium was contained in the solid.

[Polymerization of Propylene]

Polymerization of propylene was carried out as described in Example 1 except that the so-obtained solid catalyst component (A) was used. The obtained results are shown in Table 6.

EXAMPLE 23

Polymerization of propylene was carried out as described in Example 22 except that the amount used of phenyltriethoxysilane was changed to 79.2 mg. The obtained results are shown in Table 6.

EXAMPLES 24 THROUGH 26

A solid catalyst component (A) was prepared as described in Example 22 except that the amounts of $SiCl_4$ and $TiCl_4$ and the reaction temperature were changed as shown in Table 6. By using the so-obtained solid catalyst component (A), polymerization of propylene was carried out as described in Example 22 except that the amount used of phenyltriethoxysilane was changed as shown in Table 6. The obtained results are shown in Table 6.

COMPARATIVE EXAMPLES 4 AND 5

By using the solid catalyst component (A) prepared in Example 22, polymerization of propylene was carried out as described in Example 22 except that ethyl benzoate in an amount shown in Table 6 was used instead of phenyltriethoxysilane. The obtained results are shown in Table 6.

TABLE 6

| | Synthesis of Solid Catalyst Component | | | Ti Content (% by wt.) | Phenyl triethoxy-silane (mg) | Results of Polymerization of Propylene | | | | | |
|---|---|---|---|---|---|---|---|---|---|---|---|
| | Amount of $SiCl_4$ (ml) | Amount of $TiCl_4$ (ml) | Reaction Temp. (°C.) | | | Activity (g of polymer/g of solid catalyst) | Atactic Formation Ratio (%) | Product II (%) | Total II (%) | M.I. (g/10 min.) | Bulk Density of Polymer (g/cc) |
| Exam. 22 | 5.8 | 5.4 | 90 | 5.01 | 26.4 | 10,100 | 5.35 | 94.3 | 89.3 | 3.4 | 0.41 |
| Exam. 23 | 5.8 | 5.4 | 90 | 5.01 | 79.2 | 8,000 | 2.76 | 95.6 | 93.0 | 3.1 | 0.42 |
| Exam. 24 | 5.8 | 2.0 | 50 | 4.09 | 26.4 | 5,700 | 4.30 | 94.6 | 90.5 | 9.8 | 0.41 |
| Exam. 25 | 5.8 | 2.0 | 90 | 3.83 | 26.4 | 5,600 | 5.06 | 95.0 | 90.2 | 7.2 | 0.40 |
| Exam. 26 | 2.9 | 2.7 | 30° C., 2 hrs & 70° C., 2 hrs | 7.76 | 105 | 3,600 | 2.50 | 96.0 | 93.6 | 29.7 | — |
| Comp. Exam. 4 | 5.8 | 5.4 | 90 | 5.01 | Ethyl benzoate, 72.4 | 6,000 | 12.5 | 89.3 | 78.1 | 2.1 | 0.36 |
| Comp. Exam. 5 | 5.8 | 5.4 | 90 | 5.01 | Ethyl benzoate, 108.6 | 850 | 15.2 | 90.5 | 76.7 | — | — |

COMPARATIVE EXAMPLE 6

A solid catalyst component (A) was prepared as described in Example 22 except that $SiCl_4$ was not used. By using the so-prepared solid catalyst component (A), polymerization of propylene was carried out as described in Example 22. The obtained results are shown in Table 7.

TABLE 7

| | Synthesis of Solid Catalyst Component (A) | | | Ti Content (% by wt.) | Phenyl triethoxy-silane (mg) | Results of Polymerization of Propylene | | | | | |
|---|---|---|---|---|---|---|---|---|---|---|---|
| | Amount of $SiCl_4$ (ml) | Amount of $TiCl_4$ (ml) | Reaction Temp. (°C.) | | | Activity (g of polymer/g of solid catalyst) | Atactic Formation Ratio (%) | Product II (%) | Total II (%) | M.I. (g/10 min.) | Bulk Density (g/cc) |
| Exam. 22 | 5.8 | 5.4 | 90 | 5.01 | 26.4 | 10,100 | 5.35 | 94.3 | 89.3 | 3.4 | 0.41 |

TABLE 7-continued

| | Synthesis of Solid Catalyst Component (A) | | | Ti Content (% by wt.) | Phenyl triethoxy-silane (mg) | Results of Polymerization of Propylene | | | | | |
|---|---|---|---|---|---|---|---|---|---|---|---|
| | Amount of SiCl$_4$ (ml) | Amount of TiCl$_4$ (ml) | Reaction Temp. (°C.) | | | Activity (g of polymer/g of solid catalyst) | Atactic Formation Ratio (%) | Product II (%) | Total II (%) | M.I. (g/10 min.) | Bulk Density (g/cc) |
| Comp. Exam. 6 | 0 | 5.4 | 90 | 9.08 | 26.4 | 580 | 3.77 | 96.1 | 92.6 | — | — |

What is claimed is:

1. A process for the preparation of olefin polymers by contacting an olefin with a catalyst thereby polymerizing the same, which catalyst comprises:

(A) a solid catalyst component obtained by contacting a magnesium dihalide with a titanium tetraalkoxide and then with a polymeric silicon compound having a structure containing units represented by the formula:

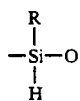

wherein R stands for a hydrocarbon residue of 1 to 10 carbon atoms, and then contacting the solid component thus obtained with a halogen compound of silicon in an amount of $1 \times 10^{-2}$ mols to 100 mols per mol of said magnesium dihalide or with a combination of a halogen compound of silicon and a halogen of titanium each in an amount of from $1 \times 10^{-2}$ mol to 100 mols per mol of said magnesium dihalide;

(B) an organoaluminum compound; and (C) an organosilicon compound, which is tertbuylmethyldimethoxysilane.

2. The process as claimed in claim 1, wherein said organoaluminum compound (B) is present in the catalyst in an amount ranging from 1 to 1000 mols per gram atom or titanium in said solid catalyst component.

3. The process as claimed in claim 1, wherein said organosilicon compound component (C) is present in said catalyst in an amount ranging from 0.001 to 1 mol per mol of said organoaluminum compound.

4. The process as claimed in claim 1, wherein the halogen compound of titanium is titanium tetrachloride or trichlorobutoxytitanium.

5. The process as claimed in claim 1, wherein the olefin is propylene.

* * * * *